United States Patent [19]

Cook et al.

[11] 4,362,618

[45] Dec. 7, 1982

[54] WATER FILTER

[76] Inventors: Don E. Cook; Dorothy M. Cook, both of P.O. Box 452, Greenville, Tex. 75401

[21] Appl. No.: 267,470

[22] Filed: May 27, 1981

Related U.S. Application Data

[63] Continuation-in-part of Ser. No. 125,584, Feb. 29, 1980, Pat. No. 4,301,009.

[51] Int. Cl.³ .............................................. B01D 23/10
[52] U.S. Cl. ...................................... 210/275; 210/283; 210/290
[58] Field of Search .............. 210/275, 283, 284, 288, 210/290

[56] References Cited

U.S. PATENT DOCUMENTS

| | | | |
|---|---|---|---|
| 645,892 | 3/1900 | Cummings | 210/264 |
| 807,513 | 12/1905 | Stade | 210/283 |
| 1,788,510 | 1/1931 | Everson | 210/298 |
| 1,975,306 | 10/1934 | Yates | 210/24 |
| 3,174,623 | 3/1965 | Sloan | 210/285 |
| 3,178,024 | 4/1965 | Jacuzzi | 210/253 |
| 3,207,312 | 9/1965 | Griswold | 210/141 |
| 3,266,628 | 8/1966 | Price | 210/94 |
| 3,529,726 | 9/1970 | Keenan | 210/232 |
| 3,554,377 | 1/1971 | Miller | 210/275 |
| 3,675,775 | 7/1972 | Obidniak | 210/138 |
| 3,994,810 | 11/1976 | Schaeffer | 210/103 |
| 4,098,695 | 7/1978 | Novotny | 210/85 |

Primary Examiner—Ivars C. Cintins
Attorney, Agent, or Firm—Hubbard, Thurman, Turner & Tucker

[57] ABSTRACT

A water filter includes a main housing defining a primary filter chamber in which is disposed an elongated tubular inner or secondary filter. Media arranged in the direction of flow includes, within the primary filter, layers of relatively coarse and fine flint gravel followed by a substantial layer of packed charcoal. The inner filter includes a substantial layer of packed charcoal and discrete layers of fine and coarse gravel near the outlet of the inner filter. The arrangement of media provides for repeated backflushings without contaminating the primary filter media. The main filter housing includes spaced apart head members which are interconnected by cylindrical tubular liners and an outer tubular shell disposed around the inner liners. The filter inlet and outlet conduits are provided with self-sealing quick disconnect coupler members for coupling the filter to a diverter circuit from the main water line or to a suitable circuit for backflushing operations.

14 Claims, 3 Drawing Figures

4,362,618

WATER FILTER

CROSS-REFERENCE TO RELATED APPLICATION

This is a Continuation-In-Part of U.S. patent application Ser. No. 125,984 filed Feb. 29, 1980 and now U.S. Pat. No. 4,301,009.

BACKGROUND OF THE INVENTION

1. Field of the Invention

The present invention pertains to a water filter apparatus which is particularly adapted for improved filtration of water for drinking purposes and for backflushing to clean the filter.

2. Background Art

A number of filtration devices have been developed for providing filtration of water and other liquids for human consumption. The increased pollution of water sources has placed burdens on municipal and commercial water systems which has resulted in a growing need for a water filter apparatus which may be conveniently adapted for use in the home and other installations where substantially pure drinking water is required. Although there have been many types of filters developed for removal of particulate matter as well as chemical impurities, most known types of filters are not particularly adapted for domestic use or for convenient backflushing to clean the filter without the necessity of removal and replacement of the filter media. Accordingly, the present invention satisfies a long felt need for an improved water filter having structural features which provide a compact and reliable apparatus and which may be placed in service for extended periods of time and requiring only periodic backflushing to clear accumulated impurities from the filter media.

SUMMARY OF THE INVENTION

The present invention provides an improved water filter apparatus comprising a generally elongated cylindrical housing defining an enclosed spacing forming a primary filter chamber together with an elongated cylindrical inner filter housing which is in series flow relationship with the primary filter. The inner or secondary filter is particularly adapted to prevent the contamination of the primary filter during backflushing operations to clear impurities from the primary filter.

The present invention also provides an improved filter apparatus having an improved arrangement of filter media which eliminates the disadvantages of certain prior art media arrangements. In particular, the present invention provides a water filter utilizing basically two grades of gravel together with densely packed powdered carbonaceous material such as charcoal or the like arranged in layers which uniquely provide a filter capable of filtration of chemical and extremely fine particulate impurities when subjected to water flow in opposite directions through the filter.

The present invention still further provides an improved filter apparatus arranged to be easily charged with multiple material media whereby the media may be suitably packed in a preferred series arrangement to prevent entrainment of the media material in the filtered water and to prevent permanent contamination of the media material by the main flow of filtered water as well as the backflushing flow of water.

Those skilled in the art will recognize further advantages and superior features of the present invention upon reading the detailed description which follows in conjunction with the drawings.

DESCRIPTION OF THE PREFERRED EMBODIMENT

Figure 1:
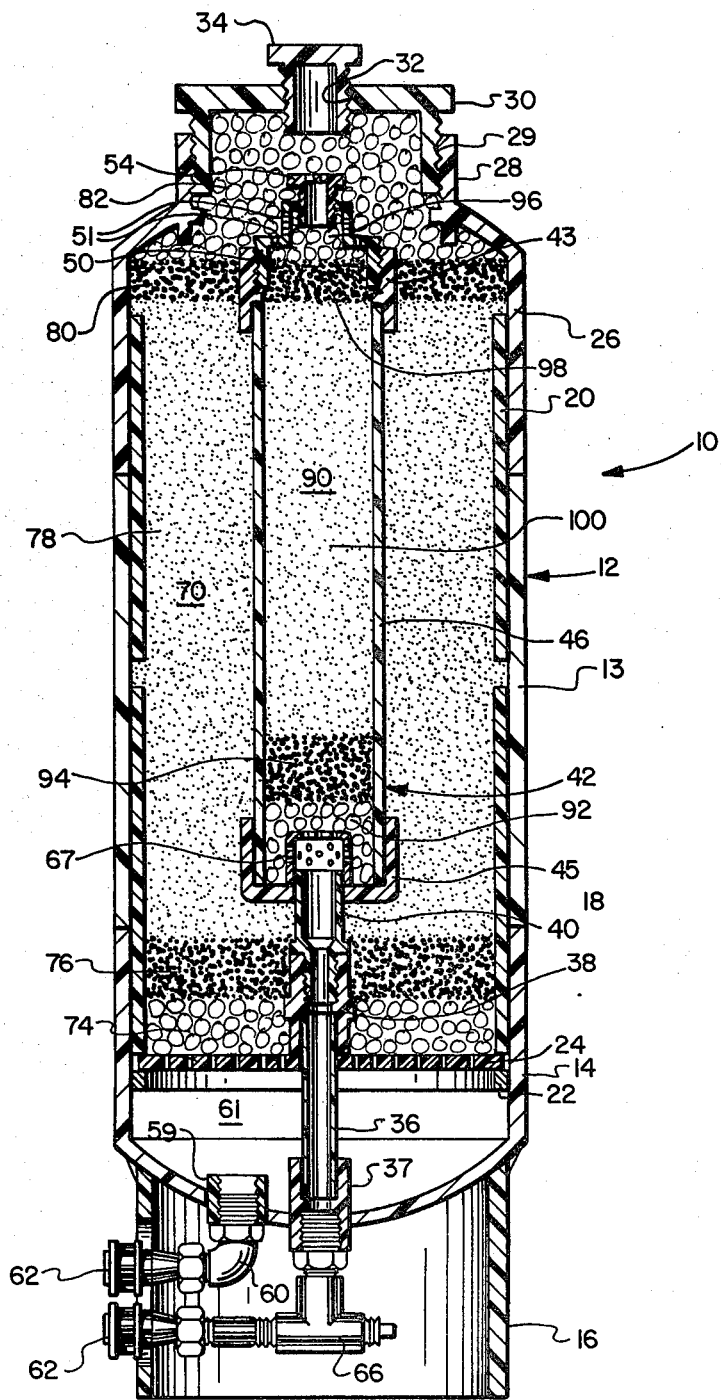
FIG. 1 is a longitudinal central section view of the water filter of the present invention.

Referring to the drawings, the water filter of the present invention, generally designated by the numeral 10, includes an elongated generally cylindrical housing 12 preferably made of several components of polyvinyl chloride plastic or the like bonded together by suitable adhesives or welding. In order to withstand normal working pressures in most water systems, the components may be made of schedule 40 PVC plastic pipe components.

The housing 12 includes a lower somewhat dome shaped head 14 mounted on a cylindrical tubular base member 16. The housing 12 also includes first and second cylindrical inner liner sections 18 and 20. The liner section 18 is positioned within the head 14 in sleeved relationship thereto and located by an annular ring 22 closely fitted within the interior of the head. A cylindrical foraminous separator plate 24 is mounted directly above the spacer ring 22 and is fixed between the liner section 18 and the spacer ring 22 for a purpose to be explained later herein. The housing 12 also includes an upper head 26 which is disposed in sleeved relationship over the upper liner section 20. The housing 12 further includes a cylindrical shell section 13 extending between and suitably fixed to the heads 14 and 26, such as by welding. The upper head 26 includes a vertically extending cylindrical top part 28 which is preferably provided with internal tapered threads 29 for receiving a main filler plug 30. The filler plug 30 is also provided with a central internally threaded opening 32 in which a secondary filler plug 34 is disposed.

The housing 12 is also provided with a centrally disposed vertically extending pipe or conduit section 36 which extends into a suitable coupling member 37 projecting through the bottom of the head 14. The pipe section 36 is connected at its upper end to a coupling member 38 disposed immediately above the separator plate 24. An adaptor 40 is threadedly mounted in the top portion of the coupling member 38 and supports an elongated tubular inner filter housing 42. The inner filter housing 42 comprises upper and lower head members 43 and 45 interconnected by an elongated tubular portion 46. The upper head member 43 is provided with internal threads for receiving a perforated cover member 50 comprising a cap or plug suitably drilled with a plurality of small holes 51 to provide a screen. The cap member 50 is also provided with an internally threaded opening for receiving in threaded engagement a secondary cap member 54.

The water connections to the lower end of the head member 14 include a conduit or coupling member 59 connected to a fitting 60 which is suitably connected to a self-sealing quick disconnect coupling member 62. The coupling member 59 extends into an inlet chamber 61 formed in the lower portion of the head 14. The coupling member 36, extending through the bottom of the head 14, is connected to a suitable Tee fitting 66, one branch of which is plugged and the other branch being suitably connected to a self-sealing quick disconnect coupling member 62. The self-sealing coupling members 62 may be of one of several types but a preferred type is made by the Hansen Manufacturing Company, Cleveland, Ohio as a series 2-HK. All of the aforedescribed components except for the coupling members 62 and certain fittings such as the fittings 60 and 66 may be made from schedule 40 PVC plastic pipe components. Referring further to FIG. 1, within the lower head member 45 of the inner filter housing 42, there is disposed a foraminous plug 67 to prevent the discharge of filter media through the pipe section 36.

It has been determined in pursuing the present invention that it is desirable to provide for backflushing the filter media to discharge particulate material as well as certain accumulated chemical substances entrapped by the media. However, prior art filters are not provided with suitable means for preventing the contamination of the filter media on the normal discharge side of the filter during the backflushing operation. In accordance with the present invention, the provision of the secondary filter comprising the housing 42 and media disposed therein, provides for backflushing the primary filter while utilizing the inner or secondary filter to prevent contamination of the primary filter media and wherein the secondary filter media may be easily flushed during the initial phase of normal operation of the primary filter after completion of backflushing. This particular arrangement within a compact, easily constructed and serviceable structure, is believed to provide a superior arrangement which solves a problem of long standing in the art of water filters primarily adapted for domestic use as well as certain commercial installations.

Moreover, applicants have discovered a particular arrangement of filter media which is believed to be superior particularly in combination with the series connected primary and secondary filters provided by the structure described and illustrated herein. The housing 12 defines a primary filter chamber, generally designated by the numeral 70, which is filled with an improved media arranged as illustrated in FIG. 1. With reference to a filter having physical dimensions wherein the chamber 70 has a diameter of approximately 6.5 inches and a length above the separator plate 24 of approximately 14 inches, the filter media comprises a first layer 74 comprising a relatively coarse gravel approximately one inch thick and a second layer 76 of a relatively fine gravel approximately one inch thick. The gravel making up the layer 74 is preferably a no. 8 flint gravel also bearing the identification number TMC-1 and the layer 76 is a no. 20 flint gravel. One top of the layer 76 is a substantial layer 78, approximately 10 inches thick, of packed carbon or charcoal powder, grade 20×40, which is packed to become a compressed cake. On top of the layer 78 is a second layer 80 of relatively fine no. 20 grade gravel also approximately 1.0 inch thick followed by a layer 82 of relatively coarse gravel of the same grade as the layer 74. The media provided within the secondary or inner filter housing 42, which forms a chamber 90 also includes spaced apart layers of coarse and fine gravel between which is interposed a substantial layer of packed charcoal. As illustrated in the drawing, the bottom of the chamber 90 is provided with a layer 92 of no. 8 coarse gravel approximately 1.5 inches thick and covering the cap 67. Above the layer 92 is disposed a layer 94 of no. 20 gravel, also approximately 1.5 inches thick. For the filter chamber 70, having the dimensions referred to hereinabove, it is preferred to provide the inner or secondary filter housing to be approximately 11.5 inches long by approximately 2 inch nominal diameter of the chamber 90. Accordingly, for layers of coarse and fine gravel 92 and 94 of approximately 1.5 inch thickness and further respective layers 96 and 98 of coarse and fine gravel, of respective thicknesses of approximately 0.75 inch and 1.25 inches, there is provided therebetween a layer 100 of packed charcoal approximately 6.5 inches thick.

The media may be conveniently packed within the filter chamber 90 by removing the plugs 50 and 54 as well as, of course, the caps 30 and 32 and packing the various media layers in the order shown. In order to provide complete packing of the chamber 90 the lug 50 is installed prior to topping off the layer 96 of coarse gravel by inserting the same through the opening in the plug 50 before insertion of the plug 54. In like manner, after installation of the layers of media 74, 76, 78, 80 and 82 the cap 30 is installed and the topping off cap 34 is removed and a final charge of coarse gravel is inserted to top off the layer 82 before reinsertion of the cap 34.

The normal direction of water flow through the filter 10 is into the inlet chamber 61 and through the separator plate 24, then through the layers of media 74 and 76 which function to filter out, respectively, coarse and fine particulate matter. The water, substantially free of particulate matter, flows through the packed charcoal layer 78 wherein chemical impurities may be extracted including free chlorine in the water. The chlorine is entrapped within the mass of charcoal wherein it remains to provide its germicidal function as water continually flows through the filter. Water flowing upward through the layer 78 then passes through the layers 80 and 82 and then, seriatim, through the layers 96 and 98 and into the layer 100 of carbon within the secondary filter chamber 90. Substantially pure water then flows through the layers 94 and 92 and through the outlet pipe section 36 to the end use such as a domestic water tap, not shown. The aforementioned water tap may be suitably connected to the outlet coupling 62.

Not only does the aforementioned arrangement of filter media provide for a superior filtering function, as discovered in accordance with pursuing the present invention, but the media is long lasting and eliminates the need for filter cloths for separating the fine media materials such as the carbon layers 78 and 100. A particular problem with the prior art type filters is the fact that filter cloths or screens provided between media layers of different grades of particle size are subject to chemical degradation as well as providing a haven for organisms including various bacteria. In developing the present invention, there has been no indication of such a problem with the particular arrangement of filter media as described herein.

When it is desired to backflush the filter 10, suitable conduits are connected to the coupling 62 in communication with the Tee fitting 66 and to a source of hot water, preferably greater than a temperature of 145° F. The coupling 62 connected to the Tee fitting 60 is connected to a discharge line for discharging the contaminated water which is backflushed out of the filter. During the backflushing operation the layers 92, 94 and 100 of filter media prevent contamination of the main filter and provide for entrapment of particulate matter and other impurities near the outlet pipe 36. Accordingly, on resumption of normal flow of water, during regular filter use, impurities trapped in the layers 92 and 94 will be flushed out through the Tee fitting 66 and associated conduits. Upon resumption of normal direction of flow an initial clearing phase is conducted to effectively backflush the inner or secondary filter. With the arrangement of the primary and secondary filters as described herein, together with the particular arrangement of filter media, a substantial number of backflushing operations may be carried out to clean the filter without the need to replace any of the filter media. Moreover, by providing the inner or secondary filter, the chance of contaminating the media of the main filter is substantially minimized. Although it is contemplated that the gravel layers 80, 82, 96 and 98 could be replaced by packed charcoal, it has been found with the structure of the filter, as illustrated in FIG. 1, that the charcoal cannot be adequately packed near the top of the head 26 and, accordingly, the arrangement of the gravel media is preferred for separating the two layers 78 and 100 of packed charcoal.

Figure 3:
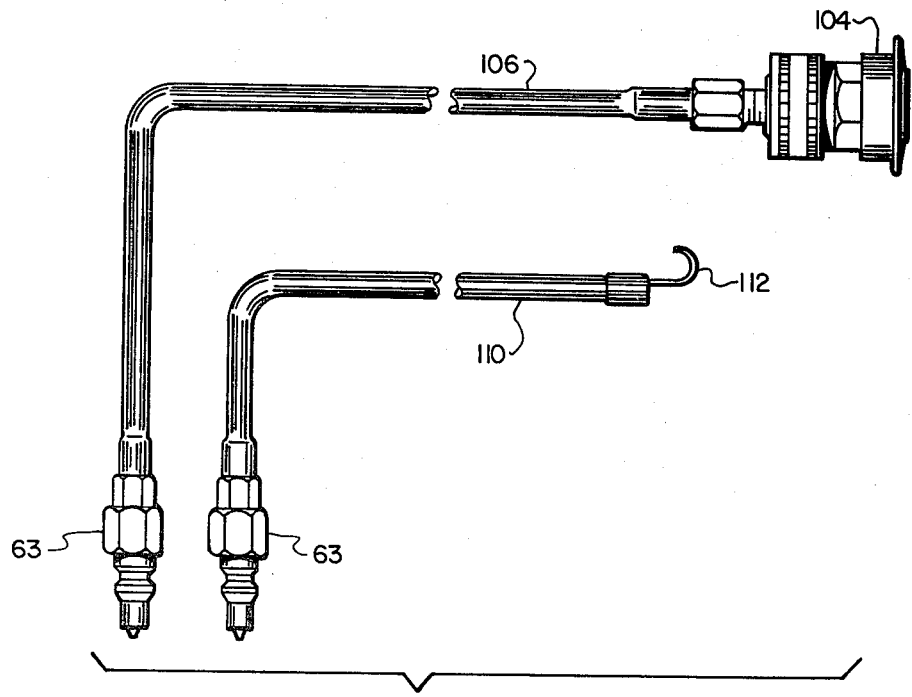
FIG. 3 is a plan view of circuit components used to backflush the filter.

The filter 10, in its complete form, is preferably arranged to include suitable conduits for connecting the filter to a source of water for backflushing operations. As illustrated in FIG. 3, a preferred arrangement of backflushing apparatus comprises a kit including a quick disconnect coupling 104 connected to a suitable length of flexible hose 106. The coupling 104 is adapted to connect to a suitable fitting such as a connector plug secured to a sink faucet or the like. A preferred plug is a standard snap coupling aerator adaptor. The opposite end of the hose 106 is provided with the plug portion 63 of the self-sealing quick disconnect coupling 62. The backflushing kit also includes a suitable length of drain hose 110 having a plug member 63 fixed to one end and a support hook 112 secured to the other end for securing the hose to a drain screen or the like in a kitchen sink, for example.

Figure 2:
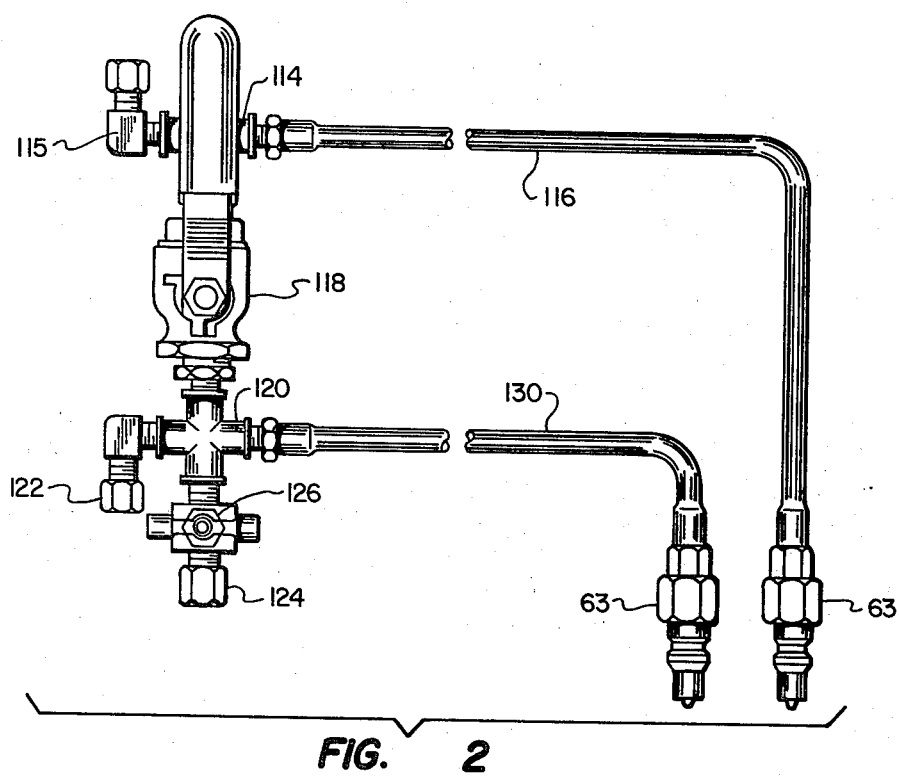
FIG. 2 is a plan view of circuit components used to connect the filter to a water source and to a receiving tap.

A preferred arrangement of plumbing for the filter 10 also includes conduit means for connecting the filter into the water line leading to the user tap, not shown. Referring to FIG. 2, a suitable conduit circuit includes a Tee fitting 114 which includes a coupling 115 for connecting to a source of water, not shown, and also to an elongated flexible hose 116, the opposite end of which is connected to a plug portion 63 which is adapted to connect to the coupling member 62 in communication with the Tee fitting 60. The Tee fitting 114 is also connected to a two-way shutoff valve 118 which is further connected to a conventional cross-fitting 120. The cross-fitting has two output couplings 122 and 124, one or both of which may be provided with a shutoff cock 126, as shown. The fourth branch of the cross-fitting is connected to a suitable length of hose 130, the opposite end of which is connected to one of the coupler plugs 63. The last mentioned coupler plug is adapted to be connected to one of the coupler members 62 in communication with the Tee fitting 66. Accordingly, when it is desired to utilize purified water from the filter 10, the shutoff valve 118 is closed so that water must flow through the hose 116 to the Tee fitting 60 and through the filter then out through the Tee fitting 66 and through the hose 130 to the cross-fitting 120, and finally to one or both of the end user connections connected to the fittings as shown.

As will be appreciated by the foregoing, the improved water filter 10 not only possesses improved structural features, but the provision of the primary and secondary filters greatly improves the life of the filter media with respect to repeated backflushings of the primary filter. Moreover, the particular media used is not only relatively inexpensive, but is easily charged into the filter chambers. The overall construction of the filter and the particular media used provides an economical but quality product which has been subject to increasing demand as the water quality from many sources decreases.

Those skilled in the art will appreciate that various substitutions and modifications to the preferred embodiment disclosed herein may be made without departing from the scope and spirit of the present invention as recited in the appended claims.

What we claim is:

1. A water filter apparatus comprising:
   a first elongated housing forming an interior area defining an inlet chamber and a primary filter chamber;
   foraminous wall means disposed in said housing and forming a common wall between said chambers;
   an inlet conduit in communication with said inlet chamber;
   a second elongated housing disposed within said primary filter chamber, said second housing forming a secondary filter chamber;
   an outlet conduit extending from said second housing to the exterior of said first housing, said outlet conduit being in communication with said secondary filter chamber;
   a first member forming a screen between said outlet conduit and said secondary filter chamber; and
   a plurality of layers of filter media in said primary and secondary chambers for filtering water flowing through said filter between said conduits.

2. The filter apparatus set forth in claim 1 wherein:
   said first housing includes a top opening formed therein, a main media filter cap threadedly engaged with said housing to close said opening, and a second filter cap removably mounted on said main cap for adding media to said primary filter chamber when said main cap is closed over said opening.

3. The filter apparatus set forth in claim 1 wherein:
   said second housing includes a main media filter plug removably fitted in one end of said second housing, and a second media filter plug removably mounted on said main filter plug for adding media to said secondary chamber.

4. The filter apparatus set forth in claim 3 wherein:
   at least one of said plugs includes means forming a screen between said filter chambers.

5. The filter apparatus set forth in claim 1 wherein:
   said plurality of layers of filter media includes a first layer of relatively coarse gravel in said primary chamber and adjacent to said wall means, a second layer of relatively fine gravel between said first layer and a third layer of packed carbon filter media in said primary chamber, a fourth layer of packed carbon filter media in said secondary chamber, a fifth layer of relatively fine gravel between said fourth layer and said first member, and a sixth layer of relatively coarse gravel between said fifth layer and said first member.

6. The filter apparatus set forth in claim 5 wherein:

said filter apparatus includes a seventh layer of relatively fine gravel in said primary chamber between said third and fourth layers with respect to the flow path of water through said filter apparatus, and an eighth layer of relatively coarse gravel between said seventh layer and said fourth layer with respect to said flow path.

7. The filter apparatus set forth in claim 6 wherein:
said filter apparatus includes a ninth layer of relatively fine gravel between said fourth layer and a tenth layer of relatively coarse gravel, said ninth and tenth layers being disposed in said secondary chamber.

8. The filter apparatus set forth in claim 7 together with:
means forming a screen on said second housing and disposed between said eighth and tenth layers.

9. The filter apparatus set forth in claim 1 wherein:
said first housing includes a pair of spaced apart upper and lower head members, first and second cylindrical inner sleeves telescopingly fitted in each of said head members, respectively, and extending axially from said head members, and an outer cylindrical shell section interposed between said head members in sleeve relationship around said first and second inner sleeves, respectively, said members being secured together to form a fluid tight housing.

10. The filter apparatus set forth in claim 9 wherein:
said lower head member includes a cylindrical support ring disposed therein and supporting said wall means between said ring and one end of the cylindrical inner sleeve disposed in said lower head.

11. The filter apparatus set forth in claim 1 wherein:
said inlet and outlet conduits extend from said lower head member and include, respectively, self-sealing quick disconnect couplings for coupling said filter apparatus to a conduit in communication with a source of water and a discharge conduit, respectively.

12. The filter apparatus set forth in claim 11 together with:
a conduit assembly for connecting said filter apparatus to said source of water and comprising:
first fitting means having a first conduit branch adapted to be connected to a water supply line, a second conduit branch connected to a first elongated flexible hose, said first hose including a mating plug for connecting to said coupling for said inlet conduit, and a third conduit branch connected to a shutoff valve; and
second fitting means having a first conduit branch connected to a second elongated flexible hose, said second hose including a mating plug for connecting to said coupling said outlet conduit, a second conduit branch of said second fitting means connected to said shutoff valve, and at least a third conduit branch for connecting said conduit assembly to a water use line.

13. The filter apparatus set forth in claim 12 wherein:
said second fitting means includes a fourth conduit branch and a second shutoff valve for controlling water flow from said second hose through said fourth conduit branch.

14. The filter apparatus set forth in claim 11 further comprising:
means for backflushing said filter apparatus including a first elongated flexible hose including coupler means at one end for connecting said first hose to a source of water and a mating plug at the other end of said first hose for connecting to said coupling for said outlet conduit, and a second elongated flexible hose including a mating plug at one end for connecting to said coupling for said inlet conduit, and means for restraining the opposite end of said second hose during water flow therethrough whereby water from said source may be conducted through said first hose, said secondary filter chamber and said primary filter chamber in reverse direction to the normal direction of water flow through said filter apparatus to backflush said filter media.

* * * * *